United States Patent

[11] 3,566,993

| [72] | Inventors | Jack D. Leatherwood<br>Hampton;<br>David G. Stephens, Yorktown; Gray V.<br>Dixon, Hampton, Va. |
|---|---|---|
| [21] | Appl. No. | 810,575 |
| [22] | Filed | Mar. 26, 1969 |
| [45] | Patented | Mar. 2, 1971 |
| [73] | Assignee | the United States of America, as represented by the Administrator of the National Aeronautics and Space Administration. |

[54] ACTIVE VIBRATION ISOLATOR FOR FLEXIBLE BODIES
2 Claims, 1 Drawing Fig.

[52] U.S. Cl. .................................................. 188/1,
310/51
[51] Int. Cl. ...................................................... F16f 15/02
[50] Field of Search ............................................ 188/1B,
103; 310/51; 248/(Inquired)

[56] References Cited
UNITED STATES PATENTS

| 2,361,071 | 10/1944 | Vang ............................ | 188/1(B) |
| 2,964,272 | 12/1960 | Olson .......................... | 188/1(B) |
| 3,483,951 | 12/1969 | Bonesho et al. .............. | 188/1(B) |

*Primary Examiner* — Duane A. Reger
*Attorneys* — Howard J. Osborn and G. T. McCoy ABSTRACT: This disclosure is related to an active vibration control arrangement for isolating a flexible body from disturbances applied either externally or internally by inertial or other forces created by the body itself, and consists of an actuator having a movable element drivingly connected to the flexible body, controlled by a signal produced by excitatory reaction of the body together with means to produce a nullifying movement of the movable member in response to the signal.

PATENTED MAR 2 1971          3,566,993
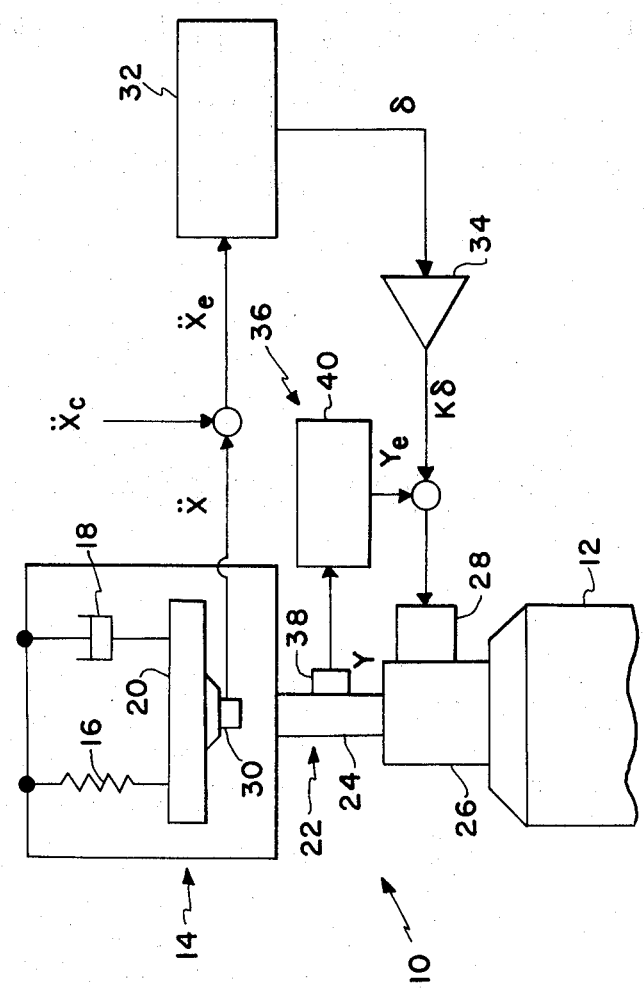
INVENTORS
JACK D. LEATHERWOOD
DAVID G. STEPHENS
BY   GRAYSON V. DIXON
ATTORNEYS

ACTIVE VIBRATION ISOLATOR FOR FLEXIBLE BODIES

The invention described herein was made by employees of the United States Government and may be manufactured and used by or for the Government for governmental purposes without the payment of any royalties thereon or therefor.

This invention is concerned with vibration control and more specifically to control of vibrations of flexible bodies, particularly in an environment producing steady acceleration components imposed on the flexible body.

Prior art vibration isolator systems are generally ineffective when attempts are made to apply them to systems wherein the flexible body of interest is characterized by low frequency resonances (1—10 Hz.), and is subject to steady and/or low frequency acceleration components as well as higher frequency vibrations. This situation exists in the launch vehicle-payload arrangement, wherein the payload may be flexible or may be more or less flexibly connected thereto and typically is subjected to launch vehicle vibrations during transport, shipboard operations, etc., steady accelerations during launching, and transient low frequency disturbances during staging.

Conventional passive isolators, usually comprised of springs and dampers, are not satisfactory in this environment since excessive isolator deflections may occur under steady loads and are not effective for isolating such low frequency flexible bodies from very low frequency disturbances, while the active isolator arrangements have been confined in the prior art to simple rigidly connected systems, and have not heretofore been successfully applied to this problem.

Therefore, it is the object of this invention to provide a vibration isolation system for a flexible body which will effectively control low and high frequency disturbances, and will at the same time limit deflection of the mass member when it is subjected to steady acceleration components.

In order to better understand the specific embodiment disclosed as descriptive of the invention reference will now be made to the FIG. which is a schematic representation of a system according to the present invention. Referring to the FIG., 10 indicates generally the vibration control system. The supporting structure 12 is shown as a rocket booster, while the flexible payload 14 is shown illustratively as flexibly supported mass 20 by a schematic representation of a spring 16 and damper 18. The payload 14 is drivingly connected to an actuator 22 including a piston 24 which is actuated by a hydraulic cylinder 26, secured to the booster 12.

The action of this actuator is controlled by a servo valve 28 which generates a flow to the hydraulic cylinder to cause movement of the piston 24 proportional to the magnitude of electrical control signals to be herein described and in a direction corresponding to the polarity of these signals.

A first signal $\ddot{X}$ is produced by an accelerometer 30 proportional to the acceleration felt by the mass 20. This signal is compared to a command signal $\ddot{X}_c$, which would be zero for this application, in turn producing an error signal $\ddot{X}_e$. This error signal is then fed to an acceleration controller 32 comprising a lead compensation network, which as is well known in the prior art, produces a high gain from high frequency signals and proportionally lower gain from lower frequency signals. Hence, the output $\delta$ of the controller 32 is zero for DC or steady state acceleration loads.

The output $\delta$ is amplified at 34 and then fed to the servovalve 28, which in turn causes the piston to move in such a manner to oppose the acceleration producing the signal, and proportionally to its magnitude, as pointed out above.

A secondary control loop 36 is included to limit movement of the actuator piston. This loop includes a linear potentiometer 38 which measures the actuator piston position and produces an output signal Y proportional to the piston position, compares it with a preset command signal in the position controller 40 to produce an output error signal $Y_e$ which is fed to the secondary control loop. This in turn restricts the piston to move about a fixed predetermined position.

Since the various components are in themselves well known in the prior art, such as the accelerometer, compensation lead network, servovalve, etc., it is not felt necessary to describe and illustrate each of these in detail, but it will be clear to one of ordinary skill in the art how to make and use the invention from the schematic representation above described. For example, a servovalve and hydraulic actuator suitable for this application is disclosed in U.S. Pat. No. 2,964,272.

From this description, the operation of the isolator should be apparent. If the payload 14 is subjected to an upward changing acceleration from any source as when subjected to transient vibrations by the booster 12, an error signal $\ddot{X}_e$ is produced, which is fed to the acceleration controller 32. Since the acceleration is changing this yields an output $\delta$ which is then amplified, and if the position controller 40 does not overrule the resulting signal $K\delta$, it is then applied to the servovalve 28, to produce a downward movement of the piston 24, thus nullifying the acceleration felt by the mass 20. Downward disturbances cause a similar but oppositely directed movement. If a steady or very slowly changing acceleration is felt by the payload 14 as from launch g loads, the gain through the acceleration controller is zero or nearly so, and no deflection of the isolation system results.

Hence, it can be seen that a flexibly supported load can be isolated from a wide range of frequencies of disturbances applied either internally or externally without undue changes in the equilibrium position of the isolator system due to steady load and/or acceleration levels.

While particular components have been referred to for the sake of clarity, it is understood that the invention may be practiced in many ways, for example, the payloads to be isolated may be discrete or distributed systems; sensing elements could be position velocity, or acceleration sensors or combinations of these; the actuating element could be hydraulic, pneumatic, electromechanical, etc.; and the control signals and networks could be fluidic rather than electrical in nature.

We claim:

1. An isolator system to isolate a flexible body from disturbances causing objectionable movement of said flexible body comprising:

actuator means having a movable member connected to said flexible body mass, control means causing said actuator movable member to move to oppose responsive movement of said flexible body to disturbances;

said control means including means for applying a force to said movable member and including sensor means producing a signal corresponding to the movement of said mass member when said mass member responds to a disturbance and also including means for applying said force in response to said signal and in a manner indicated by said signal to oppose said movement; and compensation means eliminating the response of said movable member to sensor signals corresponding to steady and very low frequency mass member response.

2. An isolator system to isolate a flexible body from disturbances causing objectionable movement of said flexible body comprising:

actuator means having a movable member connected to said flexible body mass, control means causing said actuator movable member to move to oppose responsive movement of said flexible body to disturbances;

said control means including means for applying a force to said movable member and including sensor means producing a signal corresponding to the movement of said mass member when said mass member responds to a disturbance and also including means for applying said force in response to said signal and in a manner indicated by said signal to oppose said movement; and control loop means limiting the travel of said movable member to a predetermined constant maximum value.